United States Patent [19]

Sakakiyama

[11] Patent Number: 4,711,317

[45] Date of Patent: Dec. 8, 1987

[54] SYSTEM FOR CONTROLLING A TRANSFER CLUTCH OF A FOUR-WHEEL DRIVE VEHICLE

[75] Inventor: Ryuzo Sakakiyama, Tokyo, Japan

[73] Assignee: Fuji Jukogyo Kabushiki Kaisha, Tokyo, Japan

[21] Appl. No.: 855,989

[22] Filed: Apr. 24, 1986

[30] Foreign Application Priority Data

Apr. 30, 1985 [JP] Japan ............................ 60-92974

[51] Int. Cl.⁴ .................................................. B60K 17/34
[52] U.S. Cl. ................................... 180/197; 180/142; 192/0.032; 192/0.076
[58] Field of Search ............... 192/0.076, 0.075, 0.032, 192/0.033, 0.034, 3.58, 0.094; 180/247, 249, 197, 142

[56] References Cited

U.S. PATENT DOCUMENTS

| | | | |
|---|---|---|---|
| 4,417,641 | 11/1983 | Kageyama | 180/247 |
| 4,466,502 | 8/1984 | Sakai | 180/247 |
| 4,552,036 | 11/1985 | Takano | 180/247 X |
| 4,576,061 | 3/1986 | Yamakawa et al. | 180/247 X |
| 4,582,159 | 4/1986 | Suzuki | 192/3.58 X |
| 4,617,840 | 10/1986 | Yamakawa et al. | 180/247 X |

Primary Examiner—George H. Krizmanich
Attorney, Agent, or Firm—Martin A. Farber

[57] ABSTRACT

A four-wheel drive vehicle has an engine clutch for transmitting the output of an engine to a transmission, main drive wheels operatively connected to an output shaft of the transmission, auxiliary drive wheels, and a transfer clutch for transmitting the output of the transmission to the auxiliary drive wheels. A control system is provided with a steering angle sensor producing a steering signal dependent on steering angle of the vehicle, a throttle position sensor producing a signal dependent on throttle position, and a vehicle speed sensor producing a vehicle speed signal. A control unit is provided to respond to the steering signal, the throttle position signal and the vehicle speed signal for controlling the torque capacity of the transfer clutch so as to reduce the torque capacity with increase of the steering angle and with decrease of the vehicle speed and degree of throttle position opening.

12 Claims, 9 Drawing Figures

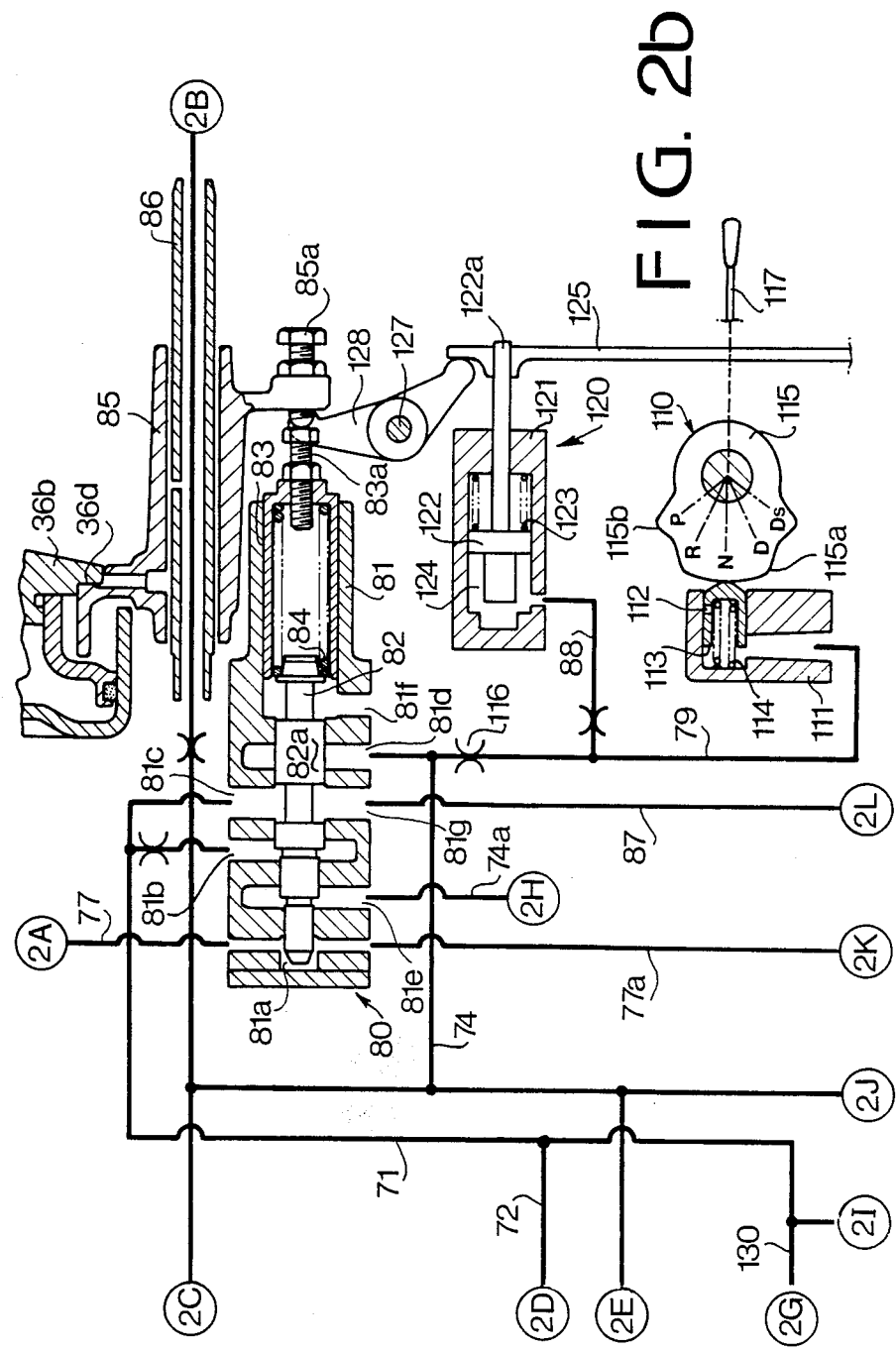

CLUTCH DISENGAGE

SYSTEM FOR CONTROLLING A TRANSFER CLUTCH OF A FOUR-WHEEL DRIVE VEHICLE

BACKGROUND OF THE INVENTION

The present invention relates to a control system for four-wheel drive vehicles, and more particularly to a system for controlling the torque capacity of a transfer clutch for four-wheel drive vehicles.

A four-wheel drive vehicle of the type in which a transfer clutch is provided for transmitting the output torque of a transmission to auxiliary drive wheels is known. In such a vehicle, a power transmission system can be converted from a two-wheel drive system to a four-wheel drive system by engaging the transfer clutch. Meanwhile, when the vehicle negotiates corners, braking phenomenon called "tight corner braking" will occur at a sharp corner. This is caused by greater radius of turning of the front wheels than that of turning of the rear wheels and therefore tendency to rotate faster than the rear wheels, so that a large torsional torque occurs in the system. Japanese Patent Application Laid Open No. 57-84227 discloses a system which is intended to eliminate the braking phenomenon. In the disclosed system, a four-wheel drive power transmission system is converted to a two-wheel drive power transmission system when a vehicle turns a sharp corner. However, although such a system prevents the tight corner braking at sharp corners by the two-wheel drive vehicle system, characteristics of the four-wheel drive vehicle such as driveability on slippery roads, uphill driving and other conditions are not effected. On the other hand, it is known that the magnitude of the tight corner braking varies with vehicle speed and steering angle. Namely, the magnitude increases with decreasing vehicle speed and with increasing steering angle.

SUMMARY OF THE INVENTION

The object of the present invention is to provide a system which may control the torque capacity of a transfer clutch in accordance with vehicle speed, engine load and steering angle, whereby the tight corner braking phenomenon can be properly prevented while keeping four-wheel driving of a vehicle.

According to the present invention, there is provided a control system for a four-wheel drive vehicle having an engine, a transmission, an engine clutch for transmitting the output of the engine to the transmission, main drive wheels operatively connected to an output shaft of the transmission, auxiliary drive wheels, and a transfer clutch for transmitting the output of the transmission to the auxiliary drive wheels. The system comprises a steering angle sensor producing a steering signal dependent on steering angle of the vehicle, a vehicle speed sensor producing a vehicle speed signal, and engine load detector for producing an engine load signal dependent on engine load and control means responsive to the steering signal, the engine load signal, and the vehicle speed signal for controlling the torque capacity of the transfer clutch so as to reduce the torque capacity with increase of the steering angle and with decrease of the vehicle speed and engine load.

The other objects and features of this invention will become understood from the following description with reference to the accompanying drawings.

BRIEF DESCRIPTION OF DRAWINGS

FIG. 2a to 2c show a hydraulic control circuits according to the present invention;

DETAILED DESCRIPTION OF THE PREFERRED EMBODIMENT

Figure 1A:
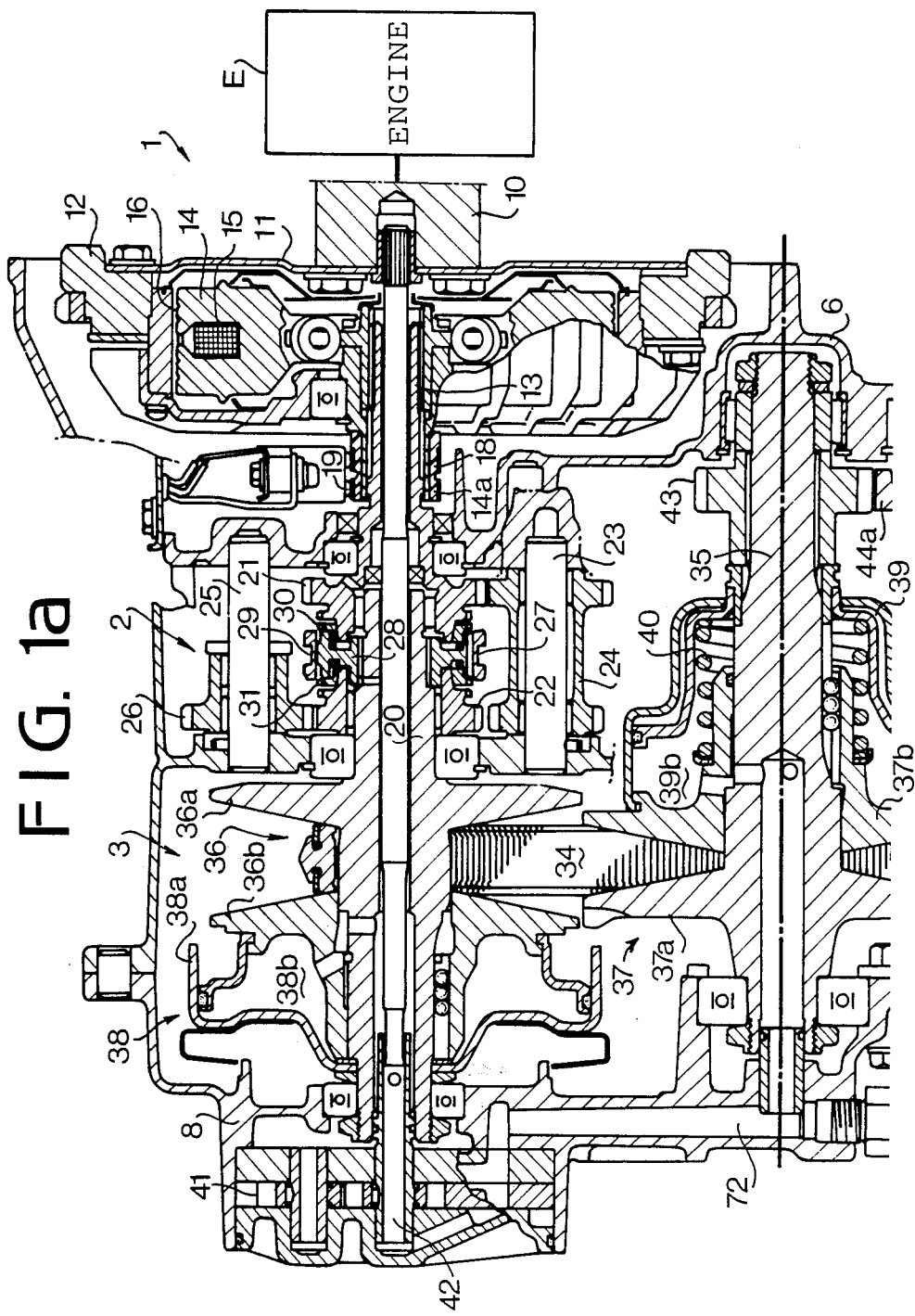
FIGS. 1a to 1c show a sectional view of an infinitely variable belt-drive transmission to which the present invention is applied.
Figure 1B:
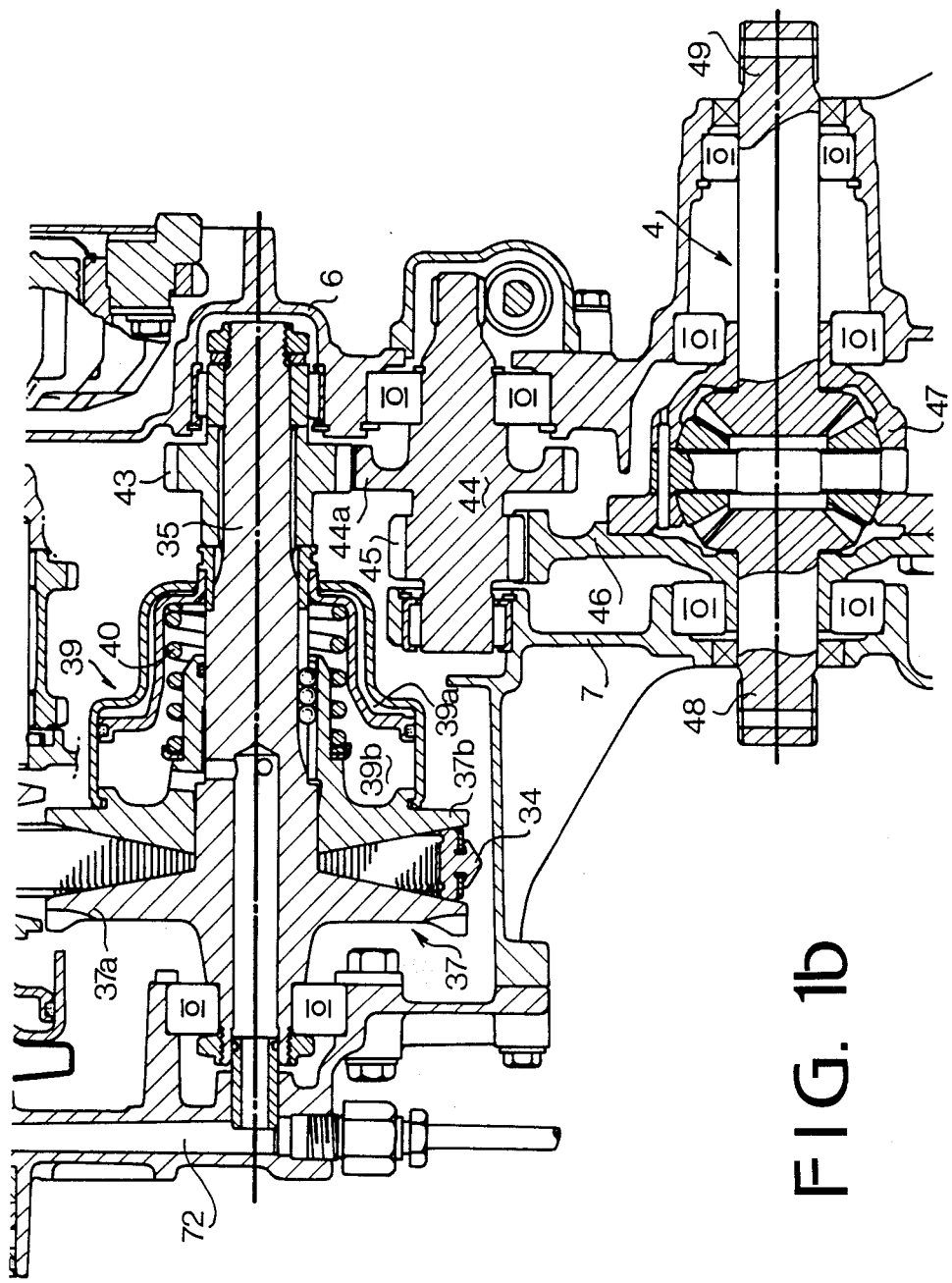
Figure 1C:
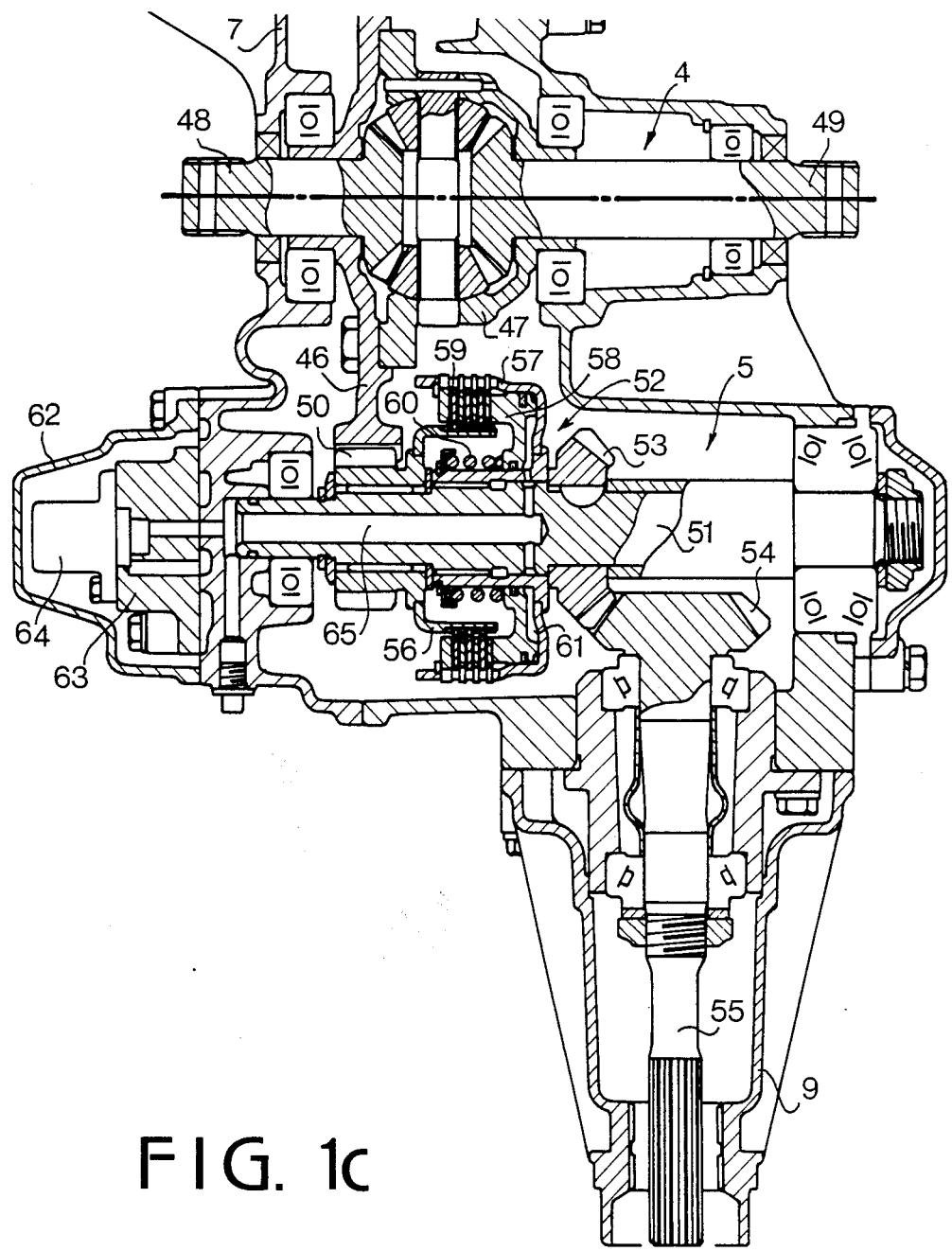

FIGS. 1a to 1c show a four-wheel drive power transmission system with an infinitely variable belt-drive automatic transmission for a motor vehicle, to which the present invention is applied. An engine E is transversely mounted on a motor vehicle at a front portion thereof. The power transmission system comprises an electromagnetic powder clutch 1, a selector device 2, an infinitely variable belt-drive transmission 3, a differential 47 for front wheels, and a transfer device 5. The electromagnetic powder clutch 1 is provided in a housing 6. The selector device 2, transmission 3, final reduction device 4 and transfer device 5 are provided in a main housing 7 and a side housing 8. An extension case 9 is secured to the main housing 7. A crankshaft 10 of the engine E is connected to an annular drive member 12 through a drive plate 11 of the electromagnetic powder clutch 1. The electromagnetic powder clutch 1 comprises a driven member 14, and a magnetizing coil 15 provided in the driven member 14. The driven member 14 has its outer periphery spaced from the inner periphery of the drive member 12 by a gap 16. Magnetic powder material is provided in the gap 16. The driven member 14 is secured to an input shaft 13 of the belt-drive transmission. A holder 14a secured to the driven member 14 carries slip rings 18 which are electrically connected to the coil 15. The coil 15 is supplied through brushes 19 and the slip rings 18 with current from a control circuit for the electromagnetic powder clutch.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 2 is provided between the input shaft 13 and a main shaft 20. The main shaft 20 is cylindrical and is disposed coaxially with the input shaft 13. The selector device 2 comprises a drive gear 21 integral with the input shaft 13, reverse driven gear 22 rotatably mounted on the main shaft 20, and a synchronizer 27 mounted on the main shaft 20. The drive gear 21 meshes with one counter gear 24 rotatably mounted on a shaft 23. Another of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of the driven gear 22 through the rings 30 or 31.

At a neutral position (N range) or a parking position (P range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive Ds range position (D range). When the sleeve 29 is engaged with the gear 22, the input shaft 13 is connected to the main shaft 20 through the gears 21, 24, 26 and 22 to provide a reverse drive range position (R range).

The main shaft 20 has an axial passage in which an oil pump driving shaft 42 connected to crankshaft 10 is mounted. In the transmission 3, an output shaft 35 is provided in parallel with the main shaft 20. A drive pulley 36 and a driven pulley 37 are mounted on shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the shaft 35 opposite disc 36a. The movable conical disc 37b also slides in a cylinder 39a secured to the output shaft 35 to form a servo device 39. A chamber 39b of the servo device 39 is communicated with the oil pump 41 through a passage 72. A spring 40 is provided to urge the movable conical disc 37b to the fixed conical disc 37a. A drive belt 34 engages with the drive pulley 36 and the driven pulley 37. The movable disc 36b has an area exposed to the line pressure which is larger than the corresponding area of the movable disc 37b.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of front driving wheels of the vehicle (not shown) through a differential 47.

The transfer device 5 comprises a transfer gear 50 engaged with the final gear 46 and rotatably mounted on a transfer shaft 51 which is transversely disposed and rotatably supported by bearings and a transfer clutch 52 in the form of a fluid operated multiple-disk friction clutch. The transfer clutch 52 comprises a hub 56 secured to the transfer gear 50, cylinder 57 secured to the shaft 51, a plurality of disks 59 provided between the hub 56 and the cylinder 57, and piston 58 for engaging the disks 59 with each other and piston chamber 61. A spring 60 is provided to urge the piston 58 to disengage the disks 59. Thus, the transfer clutch 52 operates to couple the gear 50 with the shaft 51, so that the rotation of the gear 50 is transferred to rear drive wheels of the vehicle (not shown) through shaft 51, bevel gear 53 secured to the shaft, bevel gear 54 engaged with the bevel gear 53 and rear drive shaft 55. The piston chamber 61 communicated through a passage 65 in the shaft 51 with a valve assembly 63 which is provided with a solenoid 64.

Figure 2A:
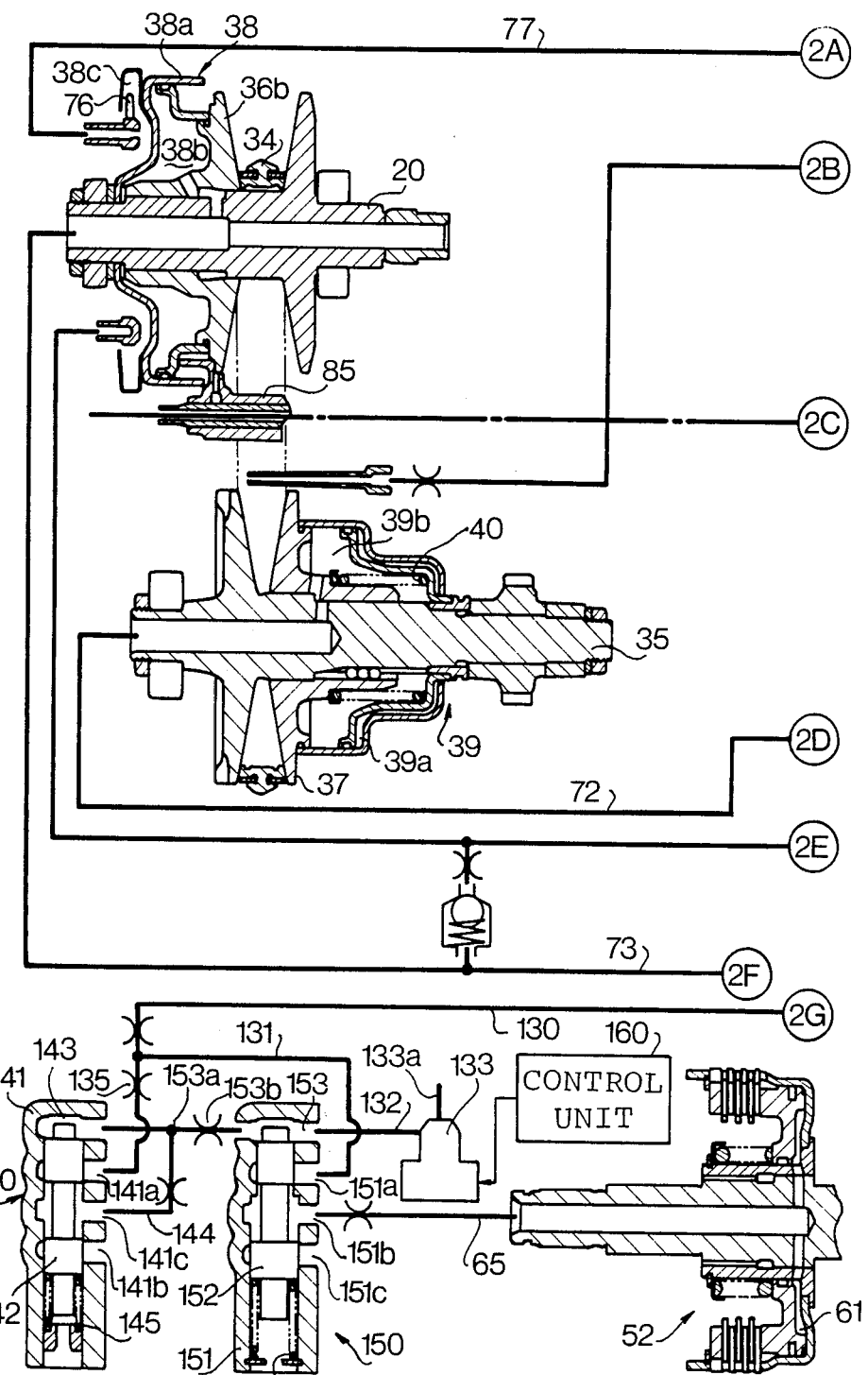
Figure 2C:
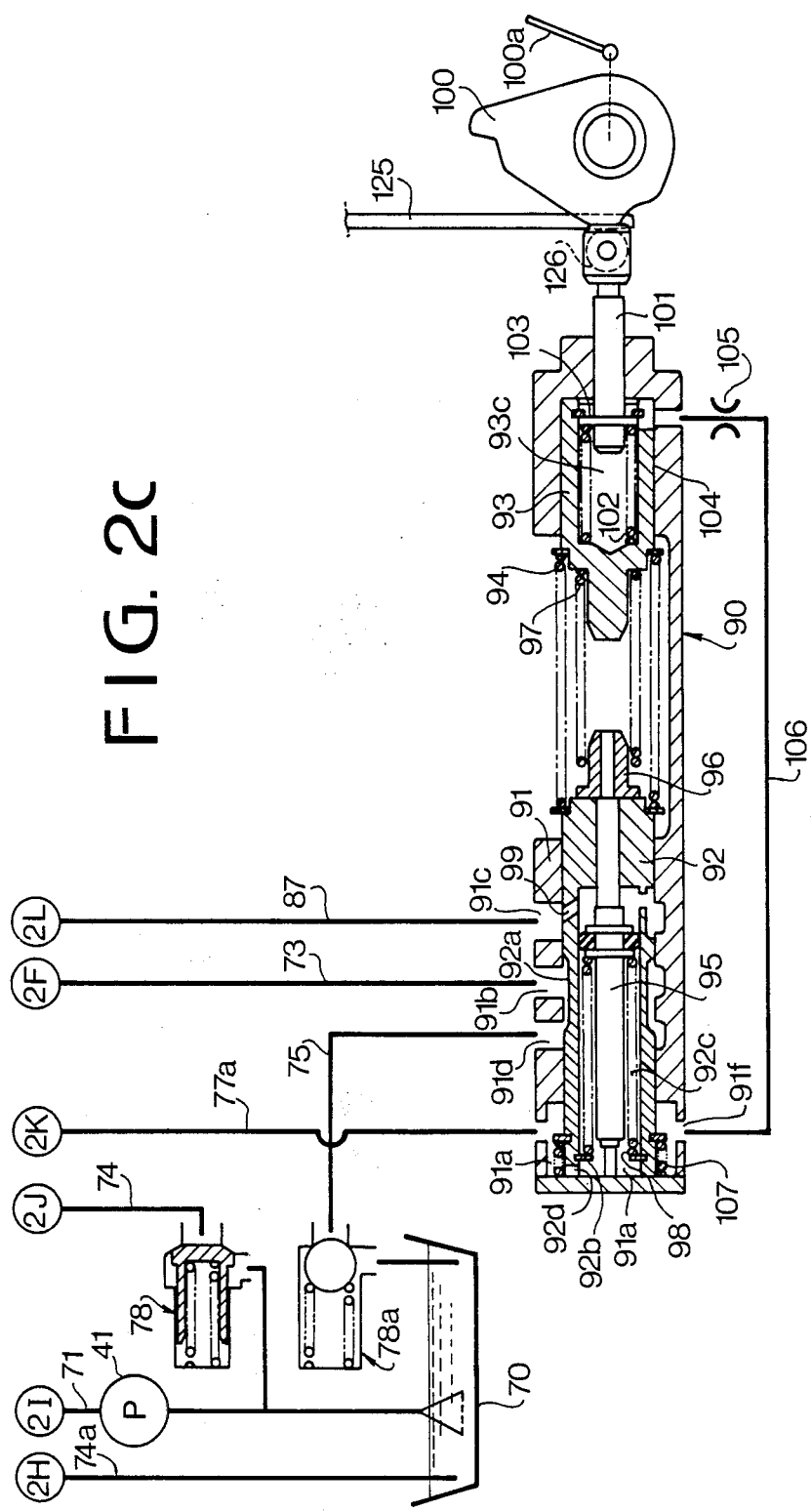

FIGS. 2a to 2c show a hydraulic control circuit according to the present invention. The circuit is provided with a pressure regulator valve 80 and a transmission ratio control valve 90.

The pressure regulator valve 80 comprises a valve body 81, spool 82, and a spring 84 provided between a spring retainer 83 and one end of the spool 82 for urging the spool to the left.

The transmission ratio control valve 90 comprises a valve body 91, spool 92, operating plunger 93, and a spring 94 provided between the spool 92 and the plunger 93. Oil in an oil reservoir 70 is supplied to a chamber 81b of the pressure regulator valve 80 through a passage 71 by the pump 41. An oil passage 72 connected to the passage 71 is communicated with the driven pulley servo chamber 39b. The passage 71 is further communicated with the drive pulley servo chamber 38b through ports 81c and 81g of the regulator valve 80, ports 91c and 91b of the transmission ratio control valve 90 and a passage 73. Oil flows back from a port 81d of the regulator valve 80 to the inlet of the pump 41 through drain passages 74 and a check valve 78. A drain port 91d of the transmission ratio control valve 90 is communicated with the oil reservoir 70 through a passage 75 and a check valve 78a.

The drive pulley cylinder 38a has an annular inside groove 38c in which a rotation speed sensor 76 in the form of a pitot tube is provided for measuring the speed of the oil in the groove, that is the speed of the main shaft 20 which is proportional to the engine speed. The pitot pressure produced by the rotation speed sensor 76 is applied to end chambers 81a and 91a of the valves 80 and 90 through passages 77 and 77a.

The port 81a of for the pressure regulator valve 80 is communicated with a select position detecting valve 110 upstream of the check valve 78 through a passage 79 and further with an actuator 120 for the transmission ratio control valve 90 through a passage 88.

A sensor shoe 85 for detecting the actual transmission ratio is slidably mounted on a lubricating oil pipe 86 which is parallel with the axis of the spool 82. A bolt 85a secured to an end of the sensor shoe 85 engages with an end of a bolt 83a secured to the spring retainer 83, and the other end of the sensor shoe 85 engages with the outside periphery 36d of the movable disc 36b. Thus, the position of the movable disc 36b which means the transmission ratio during the operation is transmitted to the spool 82 through the spring 84. At the end of the valve body 81, opposite to the spring 84, the pitot pressure is applied to the end chamber 81a, and pump oil pressure is applied to port 81b through the passage 71. A port 81e which is provided between the chamber 81a and the port 81b for preventing the leakage of the oil dependent on the pitot pressure, is communicated with the oil reservoir 70 through drain passages 74b. The port 81c is communicated with the port 81d through a chamber formed on a land 82a of the spool 82 when the spool is shifted to the right, so that the line pressure can be regulated.

Thus, the spool 82 is applied with the pitot pressure and pump oil pressure so as to be moved in the direction to open the port 81d, whereas the elastic force of the spring 84 corresponding to the transmission ratio detected by the sensor shoe 85 urges the spool 82 in the direction to close the port 81d. Accordingly, high line pressure is generated at the port 81g at a low engine speed with a large transmission ratio. The sensor shoe 85 is moved to the right in FIG. 2b as the transmission ratio decreases, reducing the force of the spring 84 to lower the line pressure. The line pressure is transmitted to the belt 34 at a proper force dependent on the transmission ratio so as not to cause the belt to slip on the pulleys.

The transmission ratio control valve 90 further comprises an annular groove 92a formed on the spool 92 so as to communicate the port 91b with 91c or port 91d for supplying or discharging line pressure to or from the drive pulley servo chamber 38b in dependencey on the position of the spool 92. A regulator spring 97 is provided between the operating plunger 93 and a retainer 96 securely mounted on a projecting end of a regulator plunger 95 which is slidably provided in an axial cavity 92c in the spool 92. A spring 98 is provided between a flange of the plunger 95 and a retainer 92b of the spool 92. The force of the regulator spring 97 is determined by the projecting extent of the plunger 95 from the spool 92 and the position of the plunger 95 is dependent on the line pressure at the port 91c which is supplied to the inside of the spool 92 through a small aperture 99.

The plunger 93 is slidably mounted in the valve body 91 and has an axial cavity 93c. A rod 101 is axially slidably mounted in the valve body 91, and a flange 103 of the rod 101 is slidably engaged with the wall of the cavity 93c. A small spring 102 is provided between the flange 103 and the plunger 93. The pitot pressure is applied to the chamber 91a through a port 92d. The cavity 93c is supplied with the pitot pressure through a port 91f and a passage 106 having an orifice 105. A spring 107 is provided between an end of the spool 92 and the valve body 91 to adjust the load on the spring 102. An end of the rod 101 engages with a cam 100 which is operatively connected to an accelerator pedal 100a of the vehicle so as to be rotated in dependency on the depression of the pedal.

When the spool 92 is moved by the pitot pressure to communicate the port 91c with port 91b, the line pressure is applied to the servo chamber 38b of the drive pulley 36 to upshift the transmission. On the other hand, when the port 91b communicates with the port 91d, the chamber 38b is drained to downshift the transmission.

The select position detecting valve 110 comprises a valve body 111, a valve 113 having a drain aperture 112 which is slidably mounted in the valve body 111, a spring 114 for urging the valve 113 against a cam 115 which rotates according to the position of a selector lever 117. The cam 115 has a lobe 115a corresponding to D, N, R range positions, and lobes 115b formed in the both sides of the lobe 115a, corresponding to P and Ds range positions. At the D, N, R range positions, the lobe 115a pushes the valve 113 in the direction to close the drain aperture 112, so that actuating oil pressure is built up. At the P and Ds range positions, the valve 113 moves outwardly to open the drain aperture 112, so that the oil pressure in the passages 74 and 79 is lowered. At that time the oil pressure decreases gradually, because of an orifice 116 provided in the oil passage 79. The oil pressure is applied to the actuator 120.

The actuator 120 comprises a cylinder 121, a piston 122 which is slidably mounted in the cylinder 121, and a spring 123 for urging the piston 122 in a direction toward a piston chamber 124 to which actuating oil pressure is applied through a passage 88. Further, a connecting rod 125 is secured to an outer end of a rod 122a of the piston 122 and is engageable with a pin 126 on the rod 101 of the transmission ratio control valve 90. At the P range or Ds range which is connected to since no actuating oil pressure exists, the piston 122 presses the rod 101 from its presetting stroke a predetermined stroke to the left in FIG. 2c shifting the transmission zone to the side of high engine revolution. Thus, the releasing of the accelerator pedal at Ds range causes the downshifting of the transmission, so that engine braking effects. Further, a correction lever 128 rotatably supported by a pin 127 is provided between the sensor shoe 85 and the rod 125, in order to correct the characteristics in the Ds range. One end of the lever 128 engages with the rod 125 only when the piston 122 of the actuator 120 moves to the left. Under such a condition, when the transmission is downshifted to shift the disk 36b to the left, the sensor shoe 85 engages with the end of the lever 128 to rotate it. Thus, the rod 125 and piston 122 are moved toward the right as the transmission ratio increases, and, at the maximum transmission ratio, the piston 122 is returned to the right end position.

A control system for the transfer clutch 52 is explained hereinafter. The control system comprises a pressure regulator valve 140, a transfer control valve 150, a solenoid operated valve 133, and a control unit 160. The pressure regulator valve 140 comprises a valve body 141, spool 142, end chamber 143, spring 145 for urging the spool 142 to the end chamber 143. A port 141a is communicated with the pump 41 through a passage 130 having an orifice 135. The spool 142 is shifted by the difference between forces exerted on both ends thereof, one of which is the pressure of oil in the chamber 143 and the other is the force exerted by the spring 145. When the spool 142 is downwardly shifted, a drain port 141b opens, thereby draining the oil in the chamber 143 through a passage 144 and ports 141c and 141b. When the spool 142 is upwardly shifted, the port 141a opens, so that oil is supplied to the chamber 143 through passage 130, ports 141a and 141c, and passage 144. Thus, the pressure of oil in the chamber 143 is kept constant.

Designating the pressure receiving area of the spool 142 in the chamber 143 by S, the regulator pressure of oil in the chamber 143 by Pr and the force exerted by spring 145 by F, $$Pr \cdot S = F$$

$$Pr = F/S$$

Accordingly, the pressure Pr can be kept constant.

The transfer control valve 150 comprises a valve body 151, a spool 152 having two pistons which are different in diameter, an end chamber 153 communicated with the chamber 143 through a passage 153a having an orifice 153b, a spring 154, a port 151a communicated with the passage 130 through a passage 131, a port 151b communicated with the piston chamber 61 of the transfer clutch 52 through passage 65, and a drain port 151c. The chamber 153 is communicated with the solenoid operated valve 133 through a passage 132 so as to provide control pressure Pc in chamber 153. The control pressure Pc and clutch pressure $P_T$ of oil in the chamber 61 urge the spool 152 downwardly against the spring 154. When the spool 152 moves downwardly, port 151a is closed and drain port 151c is opened, so that the clutch pressure $P_T$ decreases. To the contrary, when the spool 152 is upwardly shifted, prot 151a opens to increase the clutch pressure $P_T$.

Thus equation for the control pressure Pc, clutch pressure $P_T$, the force F exerted by the spring 154, the area S1 of a the large diameter piston and the area S2 of a the small diameter piston, of the spool 152 is $$Pc \cdot S2 + P_T(S1 - S2) = F$$

Therefore $$P_T(F - P_c \cdot S_2)/(S_1 - S_2)$$

Since S1, S2 and F are constant, the clutch pressure $P_T$ is inversely proportional to the control pressure $P_c$. The solenoid operated valve 133 is operated by a pulse train applied from the control unit 160. The control pressure Pc is controlled by changing the duty ratio of pulses in the pulse train.

Figure 4A:
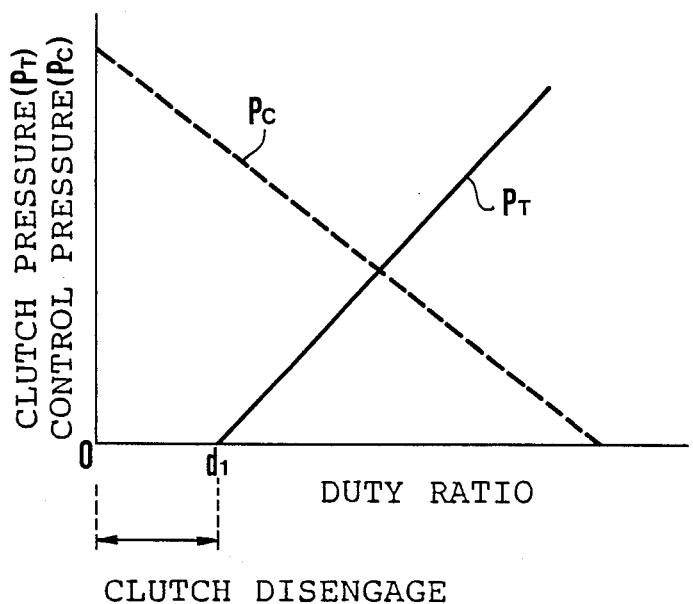
FIG. 4a is a graph showing relationship between clutch pressure, control pressure and duty ratio.

FIG. 4a shows the relationship between the clutch pressure $P_T$, control pressure Pc and duty ratio. When the duty ratio is at 0%, the solenoid operated valve 133 does not drain the oil in the end chamber through the drain passage 133a. Accordingly, the control pressure Pc is at the highest value which is equal to the regulator pressure Pr. As the duty ratio increases, the control pressure Pc reduces as shown by the dashed line. On the other hand, the clutch pressure $P_T$ is zero in a range smaller than a small duty ratio d1 and increases with increasing duty ratio from the duty ratio d1.

Figure 3:
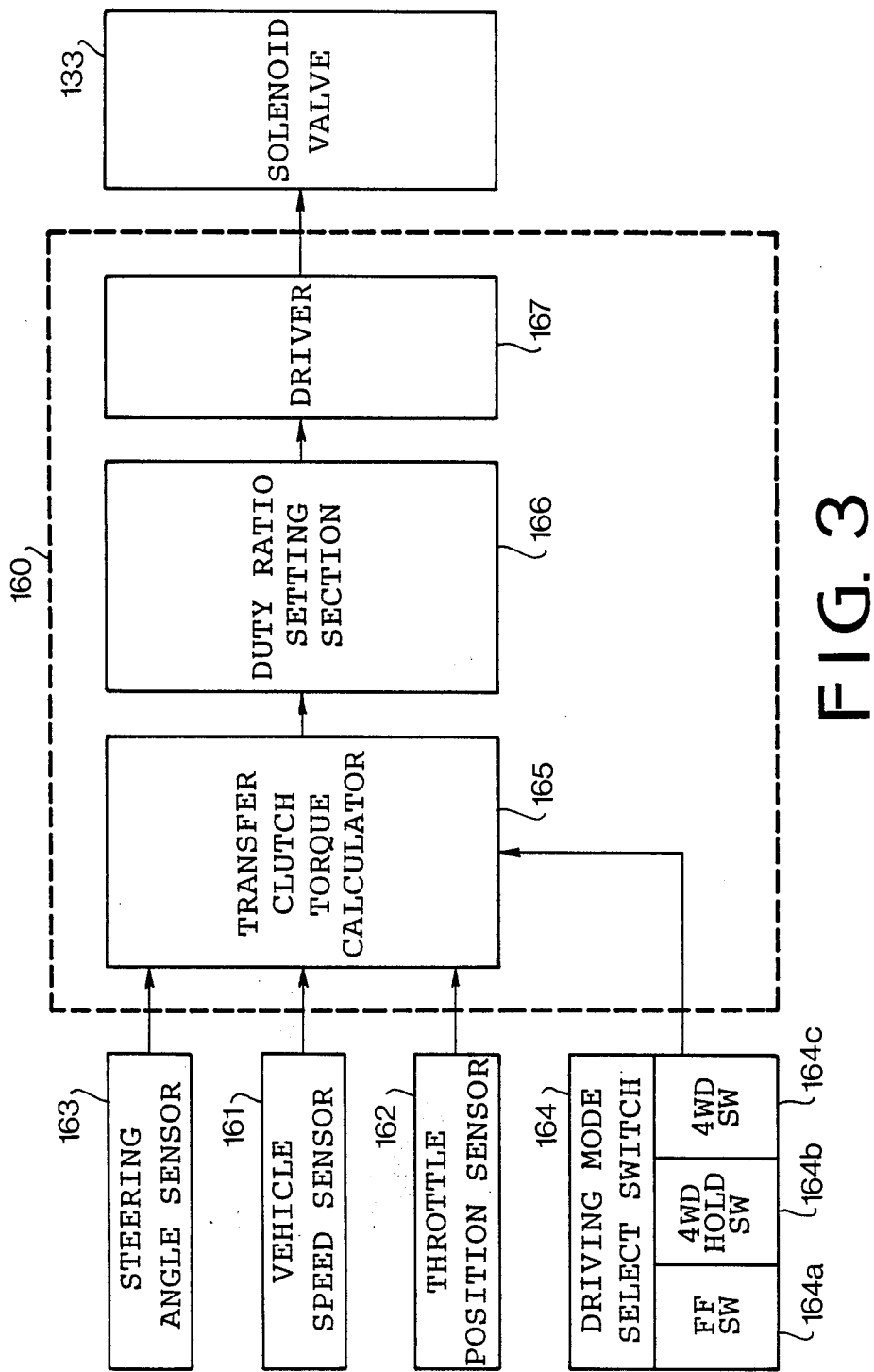
FIG. 3 shows a block diagram of a control system of the present invention.

Referring to FIG. 3 showing a control system including the control unit 160, the system is provided with a vehicle speed sensor 161, throttle position sensor 162, steering angle sensor 163, and driving mode select switch 164. The drive mode select switch 164 comprises an FF switch 164a for selecting the two-wheel drive, a 4 WD hold switch 164b for holding the power transmission in a four-wheel drive condition with a constant torque capacity of the transfer clutch, and a 4 WD switch 164c. Output signals of these sensors and switches are applied to a transfer clutch torque calculator 165.

The transfer clutch torque calculator 165 responds to the signal from the FF switch 164a to set the torque capacity of the transfer clutch 52 to zero so as to disengage the clutch, and to the signal from the 4 WD hold switch 164b to set the torque capacity to a maximum value to engage the transfer clutch 52.

Figure 4B:
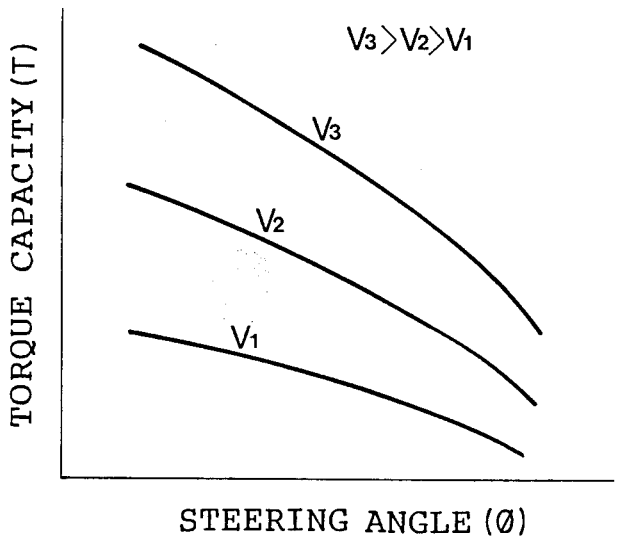
FIG. 4b shows relationship between steering angle and torque capacity.

When the 4WD switch 164c is closed, the transfer clutch torque calculator 165 produces an output signal for the torque capacity dependent on vehicle speed and steering angle. As shown in FIG. 4b, the torque capacity T is varied in proportion to vehicle speed (V) and in inverse proportion to steering angle ($\theta$). The torque capacity T is obtained from a look-up table made from the graph of FIG. 4b or calculated using a formula relative to vehicle speed (V) and steering angle ($\theta$). The calculated or looked-up torque capacity is increased as the opening degree of the throttle valve increases.

A duty ratio setting section 166 produces a duty ratio signal dependent on the output of the torque capacity calculator 165. The duty ratio signal is applied to the solenoid operated valve 133 through a driver 167.

The operation of the system is described hereinafter. While the vehicle is at a stop, the driven pulley servo chamber 39b is supplied with the line pressure adjusted by the pressure regulator valve 80 through the passages 71, 72, and the drive pulley servo chamber 38b is drained, since the spool 92 is at the left end position by the spring 94. Thus, the driving belt 34 engages with the driven pulley 37 at a maximum running diameter to provide the largest transmission ratio (low speed stage).

On the other hand, the selector lever 117 is at the N range position to select the N range, so that the drain aperture 112 of the select position detecting valve 110 is closed. When the D range is selected, the input shaft 13 and the main shaft 20 are connected to each other in the selector device 2 by the selector lever 117. When the acceleration pedal is depressed, the electromagnetic powder clutch 1 is excited by clutch current, transmitting the engine power to the drive pulley 36. The power of the engine is transmitted to the output shaft 35 at the largest transmission ratio by the driving belt 34 and driven pulley 37, and further transmitted to axles of the driving wheels. Thus, the vehicle is started.

When the pitot pressure rises, the spool 92 is shifted to the right, so that the line pressure is applied to the servo chamber 38b to move the disc 36b to the right. Thus, upshifting of the transmission starts.

When the FF switch 164a is on, the control unit 160 produce a two-wheel drive signal, so that the duty ratio setting section 166 produces a duty ratio signal for providing pulses of zero percent. Accordingly, the solenoid operated valve 133 is closed, thereby the increasing the control pressure $P_c$ in the chamber 153 of the transfer control valve 150 to a maximum value. As a result, the spool 152 is downwardly shifted to close the port 151a, which causes the clutch pressure $P_T$ to become zero to disengage the transfer clutch 52. Thus, two-wheel drive transmission system is established.

When the 4 WD switch 164c is closed, signals from the sensors 161 to 163 are applied to the control unit 160.

At low vehicle speed and large steering angle, the torque capacity calculator 165 produces an output signal for a small duty ratio representing a small torque capacity. In response to the output signal, the duty ratio setting section 166 produces a duty ratio signal, so that the solenoid operated valve 133 is operated at a small duty ratio. Thus, the transfer clutch 52 slips with a small torque, thereby preventing the tight corner braking. At high vehicle speed with small steering angle, torque capacity of the transfer clutch is increased. Further, the torque capacity is corrected in accordance with the opening degree of the throttle valve dependent on the output signal of the throttle position sensor 162 in such a manner that the torque capacity increases with an increase of the opening degree of the throttle valve. Thus, the torque capacity is properly controlled in accordance with vehicle speed, steering angle and load on the engine.

When the 4 WD hold switch 164b is closed, the duty ratio setting section 166 produces a duty ratio signal for 100%. Thus, the torque capacity is set to a maximum value to entirely engage the transfer clutch. Accordingly, the vehicle can be driven on slippery roads and rough roads.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a tranfer clutch of a four-wheel drive vehicle having an engine having a crank shaft, a transmission having an input shaft, and a main clutch operatively connected to the crank shaft of the engine and to the input shaft of the transmission for transmitting output of the engine to the transmission, the transmission being connected to transmit the output of the engine to main drive axles of the vehicle through a final reduction device, and to an auxiliary drive shaft through the transfer clutch, the system comprising a vehicle speed sensor for detecting vehicle speed and for producing a variable speed signal dependent on the vehicle speed, a steering angle sensor for detecting steering angle of the vehicle and for producing a variable steering angle signal dependent on the steering angle, engine load detector means for detecting engine load and for producing a variable engine load signal dependent on engine load, means for determining torque capacity of the transfer clutch in response to the vehicle speed signal and the steering angle signal, and for producing a determined torque capacity signal, correcting mean for correcting the torque capacity of the transfer clutch in repsonse to the engine load signal and the determined torque capacity signal, and for producing a corrected torque capacity signal, control means for continuously controlling the torque capacity of the transfer clutch to a proper value dependent on the corrected torque capacity signal so as to prevent tight corner braking while keeping four-wheel driving of the vehicle.

2. The control system according to claim 1, wherein said control means further comprises:

a duty ratio setting means for producing a duty ratio signal dependent on the corrected torque capacity signal; and means for controlling the torque capacity of the transfer clutch in response to the duty ratio signal.

3. The control system according to claim 1, wherein said system further comprises, driving mode select switch means including a four-wheel drive switch for producing a 4 WD signal in accordance with a closed condition thereof, said control means for controlling the torque capacity of the trafer clutch in repsonse to the 4 WD signal.

4. The control system according to claim 3, wherein said driving mode select switch means further includes a front wheel drive switch for selecting a front wheel drive mode of the vehicle and for producing a FF signal in accordance with a closed condition thereof, and said control means is further for disengaging the transfer clutch in response to occurrence of the FF signal.

5. The control system according to claim 3, wherein said driving mode select switch means further includes a four-wheel drive hold switch for selecting a four-wheel drive mode in accordance with a closed condition thereof, and for producing a 4 WD hold signal, and said control means is further for entirely engaging the transfer clutch in response to the 4 WD hold signal.

6. The control system according to claim 1, wherein said determining menas is a look-up table.

7. The control system according to claim 1, wherein said determining means is a calculating means for calculating the determined torque capacity signal.

8. The control system according to claim 1, wherein said engine load detector means is a throttle valve position sensor.

9. A control system for a transfer clutch of a four-wheel drive vehicle having an engine having a crank shaft, a transmission having an input shaft, and a main clutch operatively connected to the crank shaft of the engine and to the input shaft of the transmission for transmitting output of the engine to the transmission, the transmission being connected to transmit the output of the engine to main drive axles of the vehicle through a final reduction device, and to an auxiliary drive shaft through the transfer clutch, the system comprising a vehicle speed detector for detecting vehicle speed and for producing a variable vehicle speed signal as a function of the vehicle speed, a steering angle detector for detecting steering angle of the vehicle and for producing a variable steering angle signal as a function of the steering angle, engine load detector means for detecting engine load and for producing a variable engine load signal as a function of the engine load, means for determining a torque capacity for the transfer clutch in response to and as a continuously variable funcion of the vehicle speed signal, the engine load signal and the steering angle signal, and for producing a torque capacity signal representing said torque capacity, control means for continuously controlling the torque capacity of the transfer clutch to a proper value dependent on the torque capacity signal so as to present tight corner braking while keeping four-wheel driving of the vehicle.

10. The control system according to claim 9, wherein said engine load detector means is a throttle valve position sensor.

11. The control system according to claim 9, wherein said torque capacity increases with increasing vehicle speed and engine load and decreasing steering angle.

12. The control system according to claim 10, wherein said torque capacity increases with increasing vehicle speed and opening degree of a throttle valve of the engine and decreasing steering angle.

* * * * *